Aug. 1, 1950     C. W. MUSSER     2,516,902
TELESCOPIC GUN FOR AIRCRAFT PERSONNEL
CATAPULT AND OTHER USES
Filed Jan. 10, 1947     4 Sheets-Sheet 1
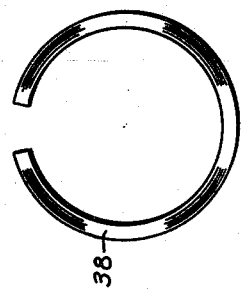
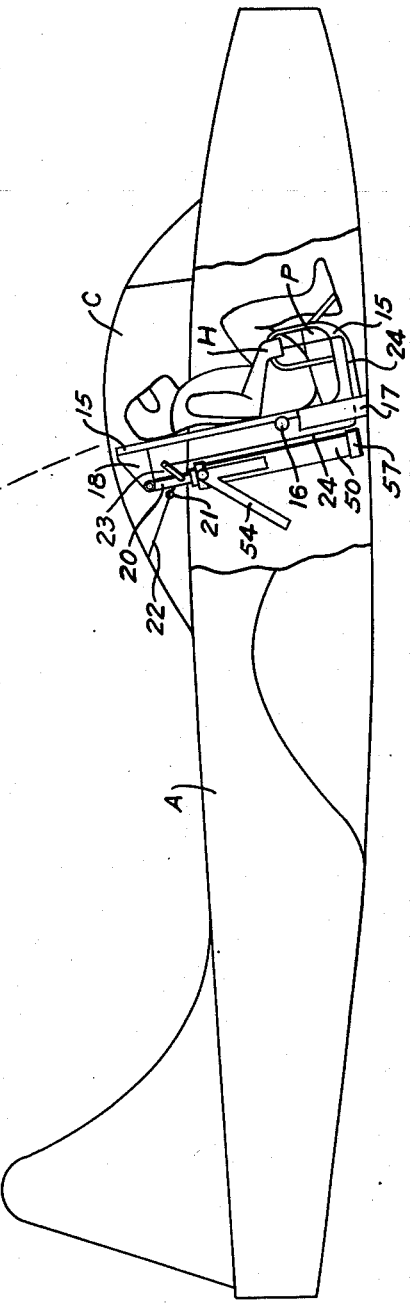
INVENTOR.
C. WALTON MUSSER.
BY
ATTORNEYS.

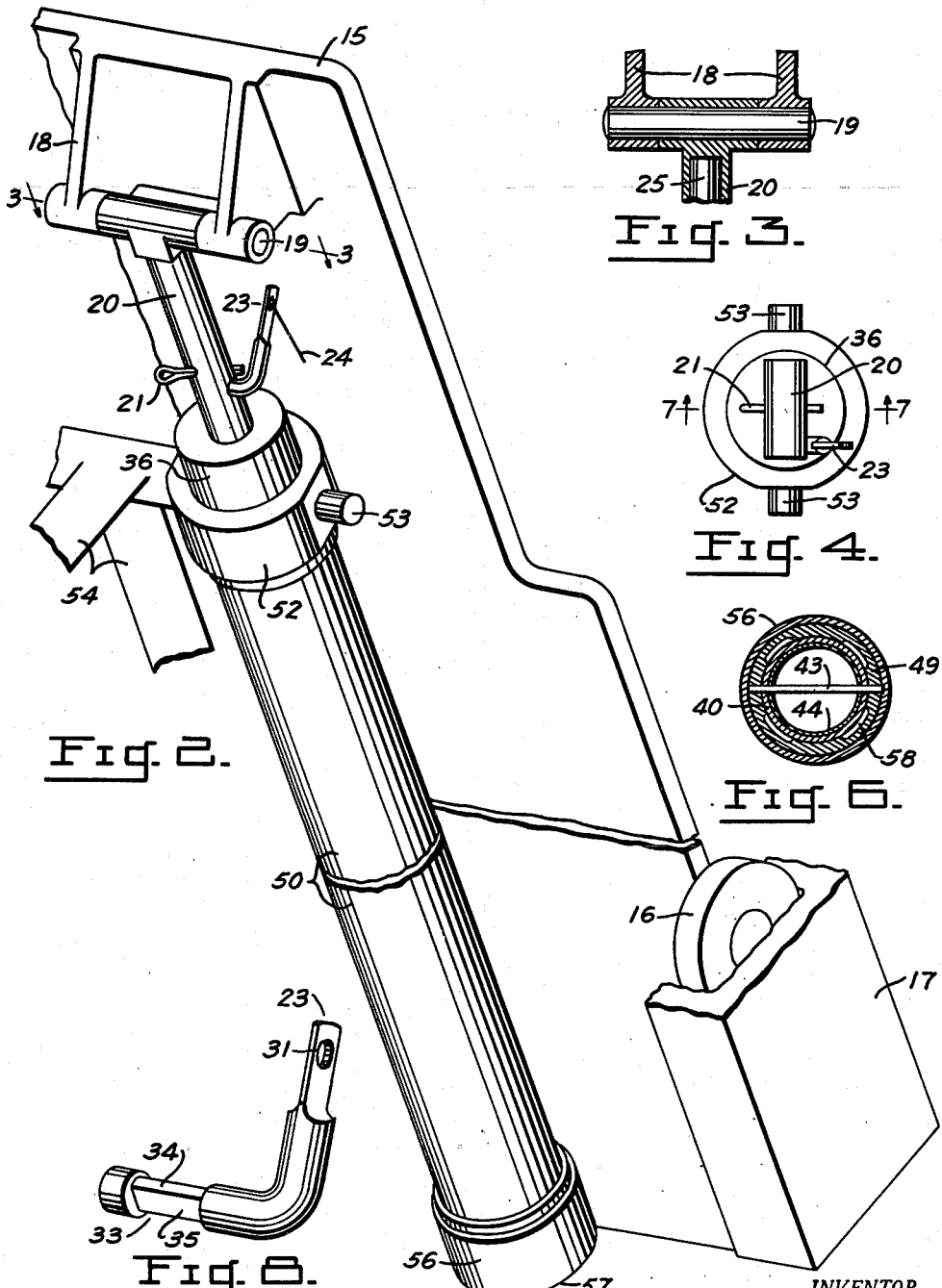

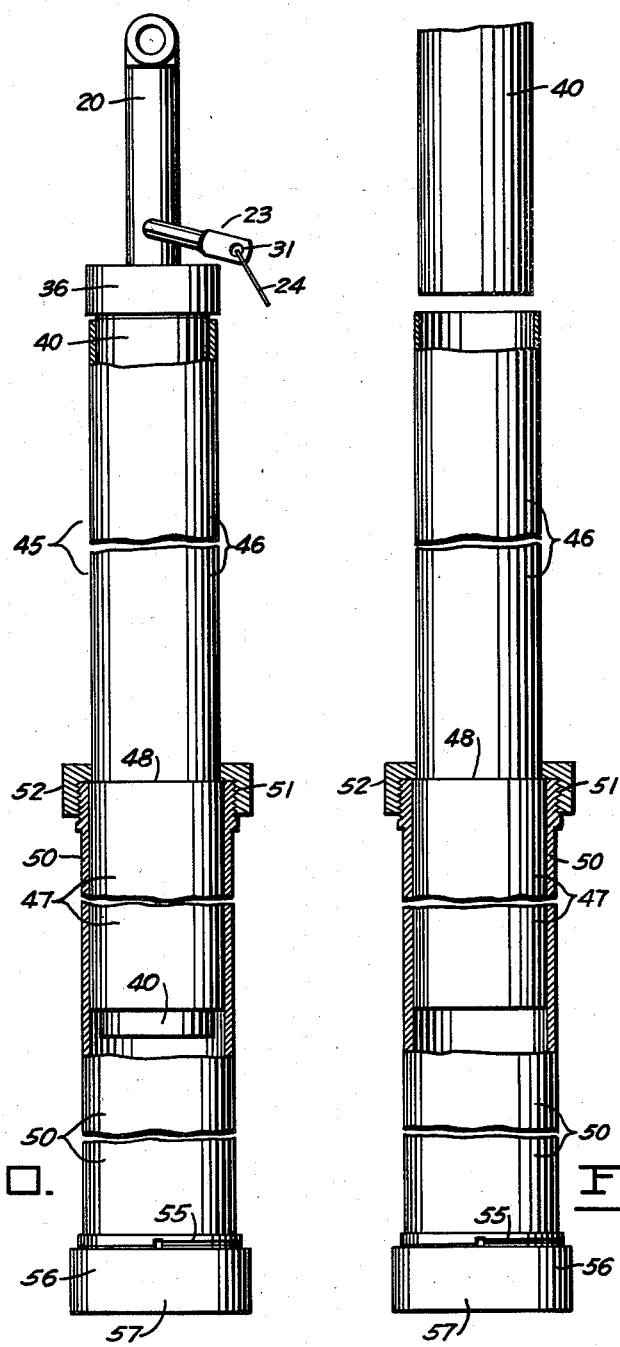

Patented Aug. 1, 1950

2,516,902

UNITED STATES PATENT OFFICE 2,516,902

TELESCOPIC GUN FOR AIRCRAFT PERSONNEL CATAPULT AND OTHER USES

Clarence Walton Musser, Philadelphia, Pa.

Application January 10, 1947, Serial No. 721,329

11 Claims. (Cl. 244—122)

(Granted under the act of March 3, 1883, as amended April 30, 1928; 370 O. G. 757)

The invention described in the following specification and claims may be manufactured and used by or for the Government for governmental purposes without the payment to me of any royalty thereon.

This invention relates to a prime mover, motor or gun in which an explosion moves a piston along a cylinder consisting of two or more telescoping tubes. This telescopic arrangement enables the motor to occupy a small space when in its collapsed position, but to apply the force of the explosion to the piston over a relatively long path of travel when the cylinder tubes are in extended position. This long path of travel permits the attainment of a higher terminal velocity of the piston with less impact or shock.

One specific use to which this motor has been put is to power a catapult for expelling personnel from aircraft.

The enormous speed of present day aircraft, particularly those propelled by jet or rocket engines, which speeds are approaching that of sound, render it exceedingly difficult for persons to leave or "bail out of" an aircraft. Not only are there gigantic forces to which a person leaving an aircraft at high speed is subjected, but these forces are so great and the speed of the aircraft is so high that it is difficult, if not impossible, for a person, by his own unaided efforts, to avoid or clear the tail or after-structure of the aircraft.

Accordingly, it is an object of this invention to provide a simple and efficient prime mover, motor or gun having a cylinder formed of a plurality of interfitting, telescoping tubes and a piston slidably mounted within the inmost of said tubes so that the motor occupies a minimum space when not in use, but applies a driving force to the piston over a maximum path of travel when the tubular parts constituting the cylinder are extended.

A further object of this invention is to provide a simple, light, practical, and efficient device which may be readily applied to aircraft of standard construction and which is under the control of a passenger in the aircraft so that he can easily and safely escape from the aircraft even when it is traveling at an exceedingly high speed.

Further objects of the invention will be apparent from the following detailed description and the accompanying drawings, in which:

Fig. 1 is a side elevation broken away to disclose the prime mover mechanism.

Fig. 2 is a perspective view of the back of the passenger's seat and the motor mechanism connected thereto.

Fig. 3 is a transverse, substantially vertical cross section on line 3—3 of Fig. 2 as viewed in the direction of the arrows.

Fig. 4 is a top or plan view of the motor mechanism.

Fig. 6 is a transverse cross section on line 6—6 of Fig. 5.

Fig. 8 is a perspective view of the sear.

Fig. 9 is a top or plan view of the compression ring.

Fig. 10 is a longitudinal cross section similar to Fig. 7 with parts broken away transversely and showing the motor intermediate its closed and extended positions.

Fig. 11 is a longitudinal cross section similar to Figs. 7 and 10 with parts broken away transversely and showing the motor in extended position with the piston expelled from the cylinder.

Figure 5:
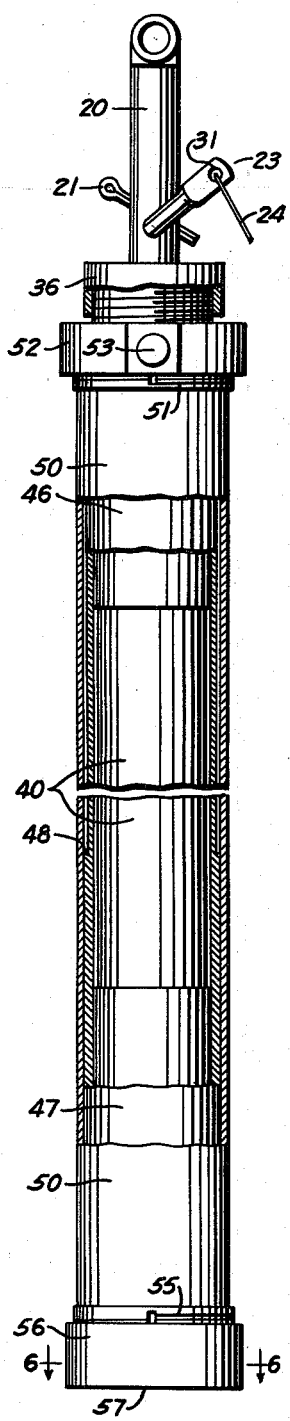
Fig. 5 is a side elevation of the motor mechanism in closed position.

One embodiment of the prime mover, motor or gun of this invention is disclosed herein as forming the engine or driving means of an aircraft personnel catapult, but it will be readily understood that this prime mover, motor or gun may be applied to many other uses.

Fig. 1 shows an aircraft A having a canopy or other cockpit housing C overlying the cockpit or part of the fuselage normally occupied by the passenger in the aircraft. In this cockpit is located seat 15 on which the aviator sits and which has rotatably mounted on it guide wheels 16 which travel along rails 17 forming a fixed part of the aircraft fuselage. The aviator's seat 15 is normally at rest in the cockpit and the aviator normally sits on its with his parachute P forming a seat cushion. At its upper end seat 15 carries a bracket 18 having tubular portions through which passes a pin 19 which also passes through an opening in the T-shaped head of block 20. A cotter pin 21 also passes through block 20 and is connected to the canopy C by means of a wire 22 or the like. A sear, generally indicated at 23 and disclosed in greater detail in Fig. 8, is rotatably mounted in block 20 and has connected to it a lanyard 24 which is trained about the fuselage of the aircraft so that its opposite or free end is convenient to the hand H of the aviator.

Figure 7:
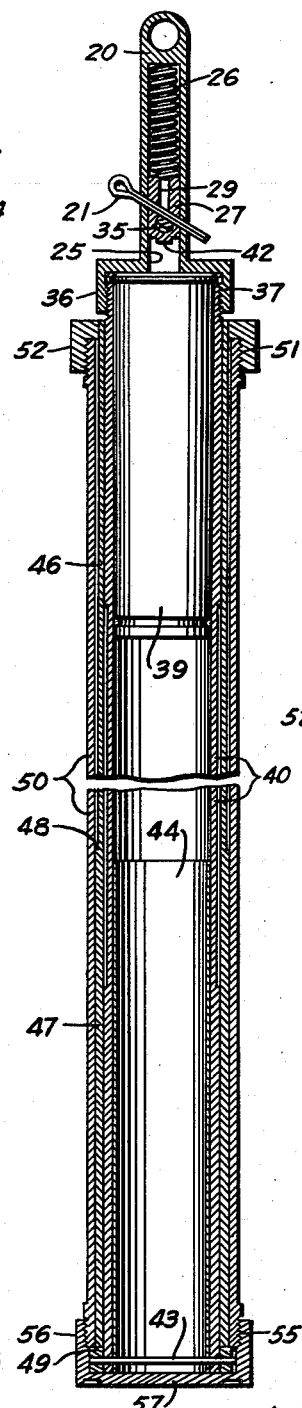
Fig. 7 is a longitudinal cross section of the motor.
Figure 7A:
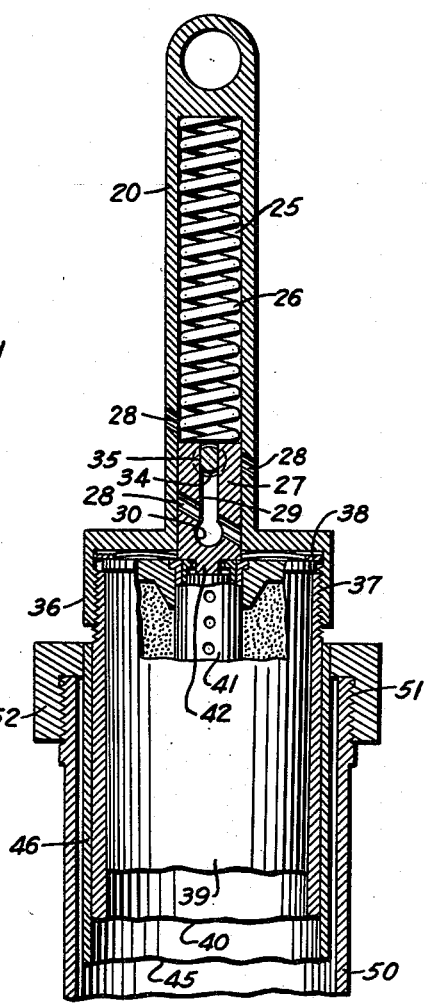
Fig. 7A is a longitudinal cross section of the firing or upper end of the motor on an enlarged scale.

Fig. 7A shows the block 20 in greater detail. There is a cavity 25 in the vertical stem of the block 20 in which cavity is located a firing pin spring 26 which abuts at its upper end against the closed end of cavity 25 and which abuts at its lower end against firing pin 27. Firing pin 27 has a hole 28 located diagonally in it and adapted to normally receive cotter pin 21 therethrough. An open-ended slot 29 extends axially of firing pin 27 and terminates at its inner end in a cylindrical opening 30.

Fig. 8 shows that sear 23 is of generally L-shape, having a hole 31 in one arm by means of which hole 31 the lanyard 24 is attached to the sear 23. The other arm of sear 23 is of generally circular shape in transverse cross section and has, intermediate its ends, a portion 33 of reduced diameter having arcuate ends 34 and flat sides 35. The diameter of the arcuate ends 34 fits rotatably in the cylindrical opening 30. The distance between the flat sides 35 is equal to the width of the slot 29 so that the firing pin 27 is locked in position with the spring 26 compressed when the portion 33 extends crosswise of the cylindrical opening 30, but the firing pin 27 is free to slide longitudinally when the flat sides 35 of the reduced portion 33 of sear 23 engage with the flat sides of the slot 29 in the firing pin 27.

Block 20 has, at its lower end, an enlarged flanged portion 36 having on its inner surface screw threads 37. At the inner end or shoulder of flanged portion 36 is located compression ring 38 which is split rather than of complete ring shape and which has undulations in it when viewed in side elevation (as in Fig. 7A). A cartridge case 39 is located in flanged portion 36 so that its rim abuts against the inner side of flanged portion 36 and the under side of its rim abuts against the upper end of tubular piston 40. At its upper end, cartridge case 39 has a primer 41 of known type having a central hole in it into which hole enters a projection 42 on the lower end of firing pin 27 so as to ignite the primer in the customary manner.

Tubular piston 40 (which in the illustrated embodiment of the present invention is the innermost of three concentric tubes, namely the piston 40, intermediate tube 45 and outside tube 50) has at its upper end screw threads which mate with the screw threads 37 on flanged portion 36. At its opposite end piston 40 has a slightly reduced outer diameter and has a pair of diametrically opposite holes in it through which passes shear pin 43. Within the end of piston 40 opposite to that containing cartridge 39 is located a tubular sleeve 44 which has adjacent one end thereof diametrically opposite holes through which pass the shear pin 43. The outer face of piston 40 (or at least the larger diametered portions thereof) fits slidably with the inner diameter of the intermediate tube 45 which forms one part of the illustrated three-member telescoping cylinder. The outer surface of intermediate tube 45 is of two diameters, the smaller diametered portion 46 extending over the greater portion of its length and the larger diametered portion 47 extending over a smaller portion of its outer surface adjacent one end thereof. A shoulder 48 is formed at the junction of the two surfaces. That end of intermediate tube 45 which is furthest from block 20 rests against the flat side of shear pin ring 49. Ring 49 has two diametrically opposite holes in it in which the ends of the shear pin 43 are located. Ring 49 has, in its inner surface, radially extending recesses 58 which underlie the end of intermediate tube 45 when that tube 45 is in collapsed or closed position.

Outside tube 50 has an internal diameter of suitable size so that the large diametered portion of intermediate tube 45 slides axially in outside tube 50. The upper end of outside tube 50 carries on its outer side screw threads 51 which engage with screw threads on the ring-shaped flange 52 which has a pair of axially protruding trunnions 53 thereon. Trunnions 53 are received in holes in a mounting 54 forming part of the fuselage of the aircraft. At its lower or opposite end from block 20, outside tube 50 has screw threads 55 on its outer side. Screw threads 55 mate with screw threads on the inner surface of flange 56 projecting from the rim of cap 57 which seals the lower end of the motor and forms the end of the cylinder composed of the two telescopically sliding tubes 45 and 50.

The operation of the prime mover, motor or gun of this invention, as applied to furnish the motive power for expelling a passenger and his seat from an aircraft, is as follows. When the aviator wishes to leave the aircraft he detaches the canopy C from the aircraft A by disengaging the fastenings between them. These fastenings are not shown since they are of a conventional type. Because the aircraft is travelling at a high rate of speed, the force of the slip stream of air over the aircraft tears the canopy C away and by means of wire 22 pulls cotter pin 21 out of block 20 thus arming the firing pin 27. In armed position the firing pin 27 is restrained against the stress of spring 26 solely by the engagement of the sides of cavity 30 with the arcuate ends 34 of the intermediate portion 33 of sear 23. The aviator can then, when he desires, pull the end of lanyard 24 with his hand H and thus rotate the sear 23 so that its reduced portion 33 has the flat sides 35 thereof aligned with the flat sides of slot 29. The expansive force of spring 26 then slides firing pin 27 along the flattened sides 35 of the reduced portion 33 of sear 23. This travel causes the projection 42 on the lower end of firing pin 27 to enter the hole in primer 41 and to ignite the primer so that the explosive charge contained within cartridge case 39 is ignited and explodes. The explosive force of the charge contained within the cartridge case 39 causes pin 43 to shear thereby freeing the tubular piston 40 so that the tubular piston 40 travels upward. As the end of tubular piston 40 emerges from shear pin ring 49, the explosive gases from the charge enter the recesses 58 in the ring 49 and thus contact with the lower end of inside tube 45. This causes intermediate tube 45 to travel upward guided in outside tube 50. This extension of intermediate tube 45 in outside tube 50 continues until shoulder 48 engages with the overlying end of the ring-shaped flange 52. This engagement prevents further projection of tube 45 out past the open breech end of tube 50.

As the extension of the tubes takes place, and the seat structure to which they are secured is thereby ejected from the aircraft, there normally will be a tendency for the terrific wind pressure to force the tubes toward the rear of the aircraft and thereby bend, if not break the tubes. If this development is not guarded against the tubes could very easily jam together before the seat has been completely catapulted from the aircraft. However, the novel pivotal mounting of the gun barrels in the aircraft fuselage (see Fig. 2) gives my novel device positive assurance against this sort of failure. By that pivotal connection the tubes or gun barrels are permitted to swing forward into the place vacated by the pilot seat upon ejection of the seat from the aircraft, thereby enabling the inner tubes and the piston attached to the back of the seat to be fully extended along a perfectly straight path throughout the entire ejection. By thus maintaining alignment of the tubes with one another, and their spaced relationship from the seat during their ejection, the danger of the tubes jamming as above described is completely eliminated.

It will further be noted (see Figs. 5, 7, 10, and 11) that provision is made for maintaining a substantially gas-tight seal between the outer surface of tube 45 and the inner surface of tube 50. This is accomplished by allowing for an adequate length of tube 45's larger diametered portion 47 to be contained within outside tube 50 (when the smaller diametered portion 46 is extended therefrom) so that the outer wall of portion 47 acts as a bearing surface in conjunction with the inner wall of tube 50. In addition, the inner diameter of ring-shaped flange 52 is such that it bears against the outer wall of tube 45's smaller diametered portion 46 when that portion of tube 45 is extended past the flange. It will be noted from the drawings, particularly Fig. 7, that a major portion of the outer wall surface of piston 40 is in bearing contact with the inner wall surface of the intermediate tube 45. By such bearing surface contacts the gases set up by ignition of the charge in cartridge case 39 are prevented from leaking past the interfaces of outside tube 50 and intermediate tube 45 or past the interfaces of tube 45 and piston 40, thereby maintaining the maximum possible pressure developed by the explosive charge until piston 40 (which is free to travel along the inner surface of intermediate tube 45) is expelled (under force of the exploded charge) from the cylinder formed of the telescoping tubes 45 and 50 concentric therewith. The reasons why the described bearing surface contacts act as a gas seal are at least twofold: one is that the rather long areas of close contact between the sliding tubes minimizes opportunity for gas leakage therebetween; the other is that the same long areas of contact plus the further aid of contact by flange 52 serve to maintain the extended portion 46 of tube 45 in alignment with the supporting tube 50, minimizing relative wobbling of the extended tube and thereby minimizing opportunity for gases to leak past the interfaces of the two tubes 45 and 50.

By the means just described full benefit of the gas pressure developed by explosion of the powder charge is obtained in extending intermediate tube 45 its maximum permissible length of travel (until prevented by shoulder 48 from emerging entirely from within tube 50). Likewise, the maximum possible gas pressure is exerted upon the freely movable tubular piston 40, and since this piston 40 is attached at its upper end to seat 15 by means of bracket 18 the maximum possible thrust attainable with a given powder charge is exerted in catapulting the seat and the aviator seated thereon together with his parachute P from the aircraft A through the opening in the fuselage from which the canopy C has been removed. The force imparted by the explosion to tubular piston 40 and the parts carried thereby is sufficient to expel the aviator, his seat 15 and his parachute P along the path indicated in Fig. 1 by the dashed line T. Thus it will be seen that the aviator is thrown entirely clear of the tail structure of the aircraft A and thus escapes any damage which would be sustained by a collision with any part of the aircraft.

Summary

From the foregoing, it will be apparent that this invention provides a prime mover, motor or gun in which a piston is slidably mounted in a cylinder having two or more telescoping parts. This prime mover, motor or gun is admirably adapted to furnish the motive power for a catapult for expelling a passenger from an aircraft safely even at high speed.

I claim:

1. An aircraft personnel catapult, including, a support for a passenger in said aircraft, an elongated projectile pivotally secured to said support, an inner gun barrel slidably surrounding said projectile and having a transversely enlarged portion at its end furthest from said support, an outer gun barrel slidably surrounding said inner gun barrel and having a closed breech at its end furthest from said support and having a transversely reduced portion arranged for engagement with the enlarged portion of said inner gun barrel when said gun barrels are in axially extended position, trunnions on said outer gun barrel pivotally supporting said gun barrels in said aircraft so as to aid in maintaining alignment of the barrels when axially extended, and an explosive charge contained within said gun barrels and adapted, upon explosion, to move said gun barrels into axially extended interengaging position and to expel said projectile from said gun barrels and to carry away the support attached to said projectile so as to lift the passenger carried by said support safely out of an aircraft even when traveling at an exceedingly high speed.

2. A motive power device for aircraft personnel catapults, said device including in combination with said aircraft, a seat structure normally mounted on said aircraft, a plurality of gas-tight, axially slidable, concentric gun barrels each of which is in bearing relationship to the other, an elongated member slidably mounted pistonwise in the innermost of said gun barrels and connected to said seat structure, a pivotal support mounting the outermost of said gun barrels in said aircraft adjacent said seating structure to maintain alignment of the concentric gun barrels with one another and their spaced relationship from the seat during ejection of the seat from the aircraft, and a firing pin manually operable to explode an explosive charge contained within the space enclosed by said gun barrels and by said member, said charge being arranged to furnish a force propelling said member out of said gun barrels upon explosion of said charge.

3. An explosion-powered catapult for ejecting safely from an aircraft a passenger traveling therein, including in combination with said aircraft: a seat structure normally mounted in said aircraft; a plurality of axially-slidable, inseparable, extensible gun barrels concentrically aligned in bearing relationship to each other; a pivotal support mounting the outermost of said gun barrels in said aircraft adjacent said seating structure to maintain alignment of the concentric gun barrels with one another and their spaced relationship from the seat during ejection of the seat from the aircraft; a cylindrically shaped projectile axially slidable and expellable from the innermost of said gun barrels and connected to said seat structure, said gun barrels and said projectile defining between them a space which is substantially gas-tight until said projectile emerges from said gun barrel; a firing pin movable into engagement with an explosive cartridge located in said space to ignite it; and a lanyard having one end connected to control said firing pin and trained about said aircraft so that its opposite end is convenient to the grasp of a passenger in said aircraft.

4. An escape device for an aircraft, including in combination with said aircraft, a personnel seat normally mounted in said aircraft but expellable therefrom, a gun having a longitudinally-extensible two-part barrel, a pivotal support mounting the outermost of said gun barrels in said aircraft adjacent said seat to maintain alignment of the concentric gun barrels with one another, and their spaced relationship from the seat during ejection of the seat from the aircraft, an elongated projectile normally located in the inner of said barrels and defining therewith an explosion-proof chamber-enclosing casing, and a cartridge of explosive located in said chamber and arranged, upon explosion, to expel said projectile from said gun barrels, whereupon the said personnel seat connected to the projectile is expelled from the aircraft.

5. A flying machine having a passenger seat detachably connected therewith and a seat-expelling device acting to remove the seat from the flying machine, including in combination with said machine, impact-expelled means extending transversely of the machine behind said seat and in contact with the back thereof and secured to the back of the seat when the seat is in normal position, explosion-confining means surrounding said impact-expelled means in operative position and secured pivotally to said machine to maintain alignment of said first and second mentioned means with one another during ejection of the seat from the aircraft, and explosion-furnishing means located between said first mentioned means and said second mentioned means and adapted to separate said first mentioned means and said second mentioned means upon the explosion of said last mentioned means.

6. Means providing for the escape of a passenger from an aircraft, including, an aircraft fuselage having a compartment formed therein, a seat structure normally mounted in said compartment, guides providing for the expelling movement of said seat structure from said fuselage, an elongated member connected to said seat structure, a pair of axially slidable gun barrels slidably surrounding said member in normal position, a pivotal support mounting the outer of said gun barrels in said fuselage adjacent said seating structure to maintain alignment of the gun barrels with one another and their spaced relationship from the seat structure during ejection of the seat from said fuselage, and an explosive charge located between said gun barrels and said member and arranged, upon explosion, to furnish an explosive force ejecting said member from said gun barrels.

7. In an aircraft, a fuselage, a seat member removably mounted therein, an elongated piston connected to said seat member, a pair of relatively-slidable mutually-inseparable cylinder members normally surrounding said piston, a pivotal support mounting the outer of said cylinder members in said fuselage adjacent said seat to maintain alignment of the concentric gun barrels with one another and their spaced relationship from the seat during ejection of the seat from the aircraft, and a firing device for igniting a charge of explosive located between said cylinder members and said piston and adapted, when exploded, to drive said piston out of said cylinder members.

8. Apparatus for safe escape from an aircraft, including in combination with said aircraft, a seat normally mounted within said aircraft, an elongated piston connected to said seat, a cylinder formed of two axially-slidable tubular portions having inter-engaging stops thereon limiting the separating longitudinal movement thereof so that sufficient lengths of the outer walls of the piston and inner tubular portion are retained in bearing surface contact with the inner walls of the tubular portions next in line toward the outside thereof so as adequately to prevent relative wobbling of the extended tubular portions and piston and concomitant leakage of gases between the interfaces of the two tubular portions with each other and of the piston with the inner tubular portion, a pivotal support mounting the outer tubular portion of said cylinder in said aircraft adjacent said seat to maintain alignment of the concentric gun barrels with one another and their spaced relationship from the seat during ejection of the seat from the aircraft, a sear for detonating a charge located between said piston and said cylinder to furnish an eruptive blast to expel said piston and inner tubular portion from the outer tubular portion, and a safety normally holding said sear against operative movement.

9. In a catapult providing an escape means for a passenger from an aircraft having a cockpit, tracks extending into said cockpit, a chair slidable on said tracks, a rodlike piston connected to said chair, a cylinder formed of telescoping sections pivotally connected to said aircraft to maintain alignment of the concentric sections with one another during axial extension thereof, said piston being slidable in said cylinder, a gas-pressure-producing cartridge located between said piston and said cylinder for ejecting said piston from said cylinder upon explosion of said cartridge, and a manually operable firing device arranged to detonate said cartridge.

10. In a gunlike motive power device, an outer tubular gun barrel having a closed end, an inner tubular gun barrel slidably mounted in said outer barrel, and a ring located between the closed end of said outer barrel and the adjacent end of said inner barrel, said ring having radially extending recesses in its inner rim, said recesses underlying the adjacent end of said inner barrel.

11. In an ejector for the safe removal of personnel from an aircraft, including in combination with an aircraft, a personnel seat, a plurality of axially aligned tubes of which the innermost alone is secured to said seat, a pivotal support mounting the outermost of said tubes in said aircraft adjacent said seat to maintain alignment of the concentric gun barrels with one another and their spaced relationship from the seat during ejection of the seat from the aircraft, and an explosive charge located in said tubes and arranged to furnish the propellant force required to propel all of said tubes except the outermost along with said seat and personnel thereon out of said aircraft.

CLARENCE WALTON MUSSER.

REFERENCES CITED

The following references are of record in the file of this patent:

UNITED STATES PATENTS

| Number | Name | Date |
|---|---|---|
| 390,920 | Tucker | Oct. 9, 1888 |
| 822,851 | Burgess | June 5, 1906 |
| 1,108,714 | Davis | Aug. 25, 1914 |
| 1,221,723 | Guichard | Apr. 3, 1917 |
| 1,324,392 | Gray | Dec. 9, 1919 |
| 1,917,011 | Bird | July 4, 1933 |
| 2,331,309 | Curriston | Oct. 12, 1943 |
| 2,459,948 | Lobelle | Jan. 25, 1949 |

FOREIGN PATENTS

| Number | Country | Date |
|---|---|---|
| 638,356 | France | Feb. 20, 1928 |
| 719,226 | France | Nov. 14, 1931 |
| 179,936 | Switzerland | Mar. 2, 1936 |